United States Patent
Perl

(10) Patent No.: US 8,814,492 B2
(45) Date of Patent: Aug. 26, 2014

(54) METHOD FOR LOADING AND UNLOADING A PALLET AND CORRESPONDING PALLETIZER

(75) Inventor: Kurt Perl, Rimsting (DE)

(73) Assignee: Krones AG, Neutraubling (DE)

(*) Notice: Subject to any disclaimer, the term of this patent is extended or adjusted under 35 U.S.C. 154(b) by 898 days.

(21) Appl. No.: 12/599,755

(22) PCT Filed: May 14, 2008

(86) PCT No.: PCT/EP2008/003875
§ 371 (c)(1),
(2), (4) Date: Aug. 31, 2010

(87) PCT Pub. No.: WO2008/138607
PCT Pub. Date: Nov. 20, 2008

(65) Prior Publication Data
US 2010/0316480 A1 Dec. 16, 2010

(30) Foreign Application Priority Data
May 14, 2007 (DE) .......................... 10 2007 022 908

(51) Int. Cl.
*B65G 65/00* (2006.01)
*B65D 19/00* (2006.01)
*B65G 57/03* (2006.01)

(52) U.S. Cl.
CPC .............. *B65G 57/03* (2013.01); *B65G 57/035* (2013.01); *Y10S 414/106* (2013.01); *Y10S 414/107* (2013.01); *Y10S 901/08* (2013.01)
USPC ........ 414/799; 414/927; 414/928; 414/790.8; 901/8

(58) Field of Classification Search
USPC ............. 414/790, 790.4, 790.6, 790.8, 792.2, 414/793.8, 794.1, 799, 923–924, 927–929, 414/222.01, 222.07, 226.05, 789.5, 792.7, 414/793; 271/218; 901/8
See application file for complete search history.

(56) References Cited

U.S. PATENT DOCUMENTS 4,269,556 A * 5/1981 Martini ...................... 414/790.8
4,557,656 A * 12/1985 Ouellette ...................... 414/790
5,199,845 A * 4/1993 Hirashima et al. ......... 414/744.1
(Continued)

FOREIGN PATENT DOCUMENTS

DE     8334970.7     3/1984
DE     9301577.1     3/1993
(Continued)

OTHER PUBLICATIONS

German Search Report for 10 2007 022 908.0, dated May 30, 2007.

*Primary Examiner* — Gregory Adams
(74) *Attorney, Agent, or Firm* — Marshall, Gerstein & Borun LLP

(57) ABSTRACT

A method for loading a pallet, including placing packages in layers on a first pallet disposed in a first pallet disposed in a first plane, providing a second pallet above the packed first pallet in a second plane, and transporting the packed first pallet away. Also, a method for unloading for unloading a pallet, including removing packages, particularly bottle crates, in layers from a first pallet disposed in a first plane, providing a second packed pallet below the first pallet in a second plane, and transporting the first pallet away. Also, a corresponding palletizer for loading or unloading a pallet in layers.

16 Claims, 4 Drawing Sheets

(56) References Cited

U.S. PATENT DOCUMENTS 5,240,369 A * 8/1993 Voss et al. .................. 414/790.8
5,269,379 A * 12/1993 Millar et al. .................... 172/19
5,630,695 A * 5/1997 McDonnell ................ 414/751.1
6,394,744 B1 * 5/2002 Price ............................ 414/810

FOREIGN PATENT DOCUMENTS

| DE | 4414001 A1 | 10/1994 |
| DE | 19515720 A1 | 11/1996 |
| EP | 1321396 A1 | 6/2003 |

* cited by examiner

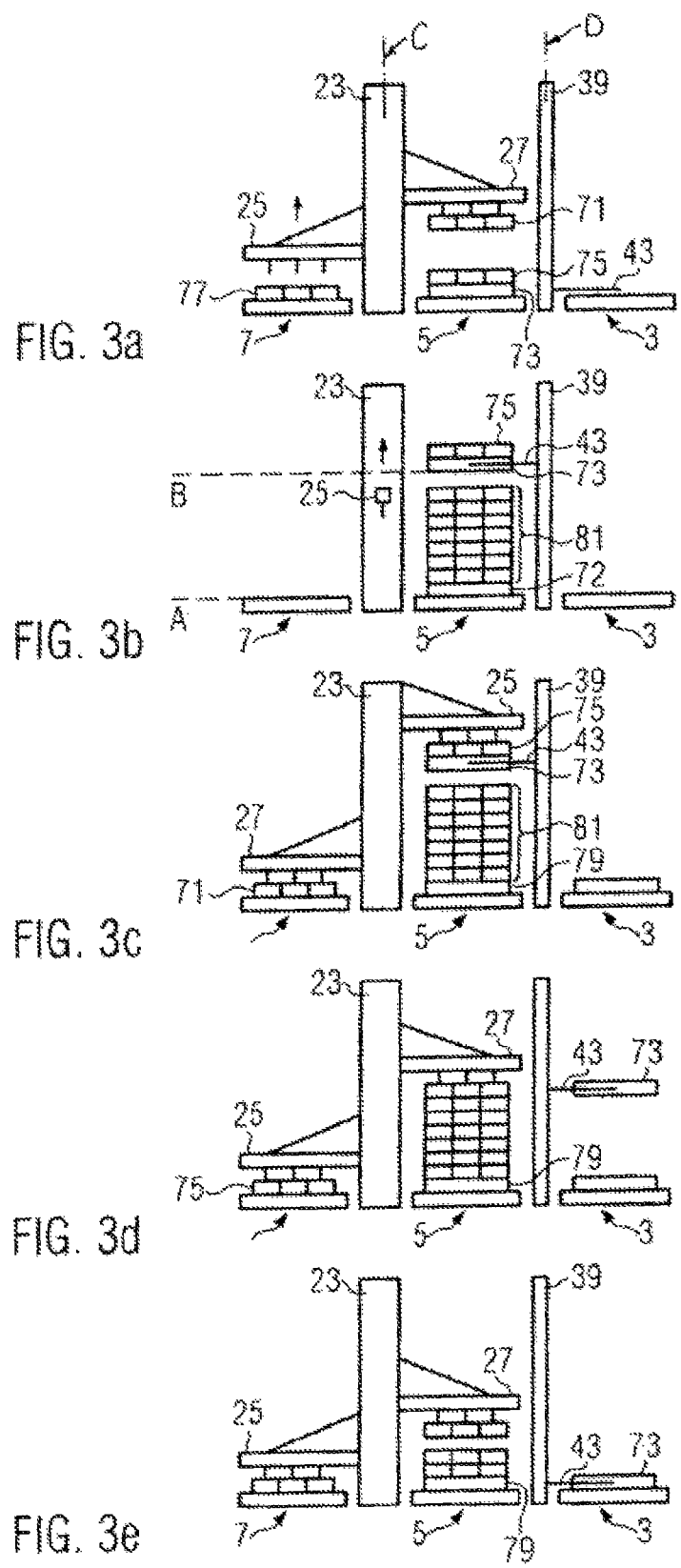

METHOD FOR LOADING AND UNLOADING A PALLET AND CORRESPONDING PALLETIZER

CROSS-REFERENCE TO RELATED APPLICATION

The present application claims the benefit of priority of International Patent Application No. PCT/EP2008/003875, filed May 14, 2008, which application claims priority of German Patent Application No. 10 2007 022 908.0, filed May 14, 2007. The entire text of the priority application is incorporated herein by reference in its entirety.

FIELD OF THE DISCLOSURE

The present disclosure relates to a method for loading and unloading a pallet as well as to a palletizer, such as for the bottling industry.

BACKGROUND

Palletizers of this kind are known. Such a palletizer provides an empty pallet in a loading station for the purpose of loading said pallet. Packages, e.g. bottle crates, single-use packages or the like, are deposited, in layers, on said pallet. To this end, the packages are lifted from a package providing station by means of a gripper head and placed on the empty or already partially loaded pallet. For transporting the packages, e.g. a rotary column provided with one or two vertically adjustable gripper heads is used. For the purpose of unloading, the above-described method takes place in reverse order. Especially when two gripper heads are used, a comparatively high throughput can be accomplished.

In spite of optimized loading and unloading of the packages with the aid of two gripper heads, the use of these known loading and unloading methods and known palletizers entails the problem that, as soon as a pallet has been fully loaded or unloaded, down times will occur during the exchange of pallets, i.e. when a new empty pallet or a new fully packed pallet are being provided. During such down times, the package providing station can neither deposit nor remove any packages and is therefore inevitably inoperative.

SUMMARY OF THE DISCLOSURE

It is therefore an object of the present disclosure to provide a method for loading and unloading a pallet and a corresponding palletizer in the case of which the down times at the end of a loading or unloading operation can be reduced and the throughput can be increased, consequently.

The method for loading a pallet according to the present disclosure allows a reduction of down times during an exchange of pallets, i.e. during the removal of a packed first pallet and the provision of a second, especially empty, pallet, by providing the second pallet on a plane above the upper surface of the packed first pallet. This has the effect that, in the loading process, the provision of a new pallet can be separated from the deposition operation in such a way that the loading of the second pallet can be started earlier than in the prior art. This is even the case if the first, already fully packed pallet has not yet or not yet fully been transported away, or if such transporting away has not yet or not yet fully been possible. It follows that an increase in the throughput during the loading process can be achieved.

According to a preferred embodiment, the packages can already be placed on the second pallet while said second pallet is still positioned above the first pallet. The second pallet can, at this time, definitely still be disposed on the second plane. It follows that, as has already been explained hereinbefore, the throughput will be optimized still further. In particular, the loading of the second pallet can already be started without delay, when the previously packed first pallet could not yet be transported away for reasons of process technology.

An advantageous embodiment is so conceived that, after the removal of the packed first pallet, the second pallet can be lowered step by step or in one go down to the first plane provided for transporting a packed pallet away. The throughput during the loading operation can be further optimized in this way. Step-by-step lowering will be advantageous especially in cases where the provision of a new layer of packages can be realized faster than the lowering of the second pallet, i.e., when a new layer is ready for deposition, the second pallet will be stopped during lowering on an adequate level and the new layer will be deposited on the said second pallet. While the next layer is being fetched, the second pallet is simultaneously lowered still further. If, however, the lowering process can be realized faster than the provision of a new layer, the second pallet can immediately be lowered to the first plane, since this will not have any reducing influence on the throughput.

A preferred embodiment is so conceived that, prior to depositing a predetermined number of layers, in particular the second or third or fourth layer of packages, on the second pallet, said second pallet can be lowered down to the first plane. This has the effect that, due to the limited load, the mechanical demands on the device holding the second pallet on the second plane or, quite generally, above the first plane, can be kept low, whereby the realization of the method according to the present disclosure will also become interesting from the economic point of view.

The method for unloading a pallet adopts the disclosed concept of providing below the first pallet that has either been unloaded partially or that is empty a new second pallet, said second pallet being here, however, a packed pallet. It follows that also during unloading, the down time during an exchange of pallets can be reduced, since, due to the temporal overlapping of the provision of the second pallet and the complete unloading of the first pallet and the removal of the empty pallet, the second pallet can also in this case be provided faster, i.e. earlier, because the first pallet is already raised to a higher level prior to having been unloaded completely and prior to the supply of the next pallet.

According to a preferred embodiment, packages can still be removed from the first pallet while the second pallet is being provided at a position below the first pallet, e.g. by introduction from the side. In particular, packages can still be removed from the first pallet, when, for reasons of process technology, the packed second pallet has already been provided at a position below said first pallet in alignment therewith. When the first pallet has been unloaded, unloading of the second pallet can be started immediately, without delay.

An advantageous embodiment is so conceived that, prior to providing the second packed pallet, the first pallet can be raised step by step or in one go to the first plane, which is the plane used for unloading and which extends above the pallet stack height. Similar to the above-described lowering, step-by-step raising will be of advantage especially in cases where the removal of a new layer of packages can be realized faster than the raising of the first pallet to be unloaded. When a gripper head is available for removing a layer of packages, the raising of the first pallet will be stopped and the uppermost layer of packages will be removed. While the removed layer of packages is being put down at a predetermined location, the first pallet can be raised further in the direction of the first plane. If the raising process is realized faster than the provision of the gripper head for removal, the first pallet can immediately be raised to the first plane, since this will not have any influence on the throughput.

Preferably, the first pallet can be raised to the first plane as soon as only a predetermined maximum number of layers of packages is present on said first pallet, said maximum number being in particular one, two or three layers of packages. It follows that, similar to the above-described loading, the mechanical demands on the device used for holding the first pallet on the first plane or raising it to the first plane or, quite generally, holding it on or raising it to a level above the second plane, can be kept low, whereby the realization of the method according to the present disclosure will also become interesting from the economic point of view.

The present disclosure additionally relates to a palletizer according to claim 9. Just as the method according to the present disclosure, also the palletizer according to the present disclosure realizes the reduction of the down time which results from the fetching and the removal of a packed pallet, by arranging the packed pallet in the loading station on a plane below an empty or only partially packed pallet for a certain period of time. The term loading station describes here the area of the palletizer where packages are placed on or removed from a provided empty or partially packed pallet, said packages being especially placed on and removed from the pallet in the form of layers. The term pallet providing station describes here the area of the palletizer where the empty pallets are provided or received individually or in the form of stacks, said pallets being then transferred to the loading station or they are fetched from the loading station. The packages may be any kind of product. The palletizer can, however, be used in a particularly advantageous manner for bottle crates, single-use packages or the like, preferably for bottles wrapped in foil or cardboard.

According to a preferred embodiment, the pallet providing station can comprise a vertically adjustable arm used for transporting a pallet from the pallet providing station to the loading station or vice versa. This arm serves to convey the pallet from the pallet providing station to the loading station and vice versa, and it also serves to hold a pallet above a packed pallet. It follows that the palletizing device according to the present disclosure can be realized easily.

According to a preferred embodiment, the arm can be implemented such that it is not only vertically adjustable but also adapted to be swivelled and/or moved translationally, at least in the horizontal plane, i.e. at right angles to its vertical movability. By means of an arm configured in this way, the advantages of the present disclosure can be realized without major technical expenditure.

According to an advantageous embodiment, the arm can additionally be dimensioned such that it can carry at most one pallet with a predetermined number of layers of packages, in particular one or two or three layers of packages. It follows that the mechanical demands on the arm are comparatively low, so that it can be realized with a technically simple design without any negative influence on the advantages of the reduced down time. It turned out that, for the known loading and unloading processes, it will suffice when the arm is dimensioned for one, two or three layers of packages, since the period of time between the provision of the second pallet and the deposition or removal of the first, second or third layer of packages is sufficiently long for transporting away the pallet below said second pallet or, in the case of unloading, for providing the pallet below said second pallet. A statically stronger structural design of the arm can be avoided in this way.

According to one variant, the palletizer may additionally comprise a package providing station having at least a second vertically adjustable arm for providing the packages on the pallet. By synchronizing the package providing station with the pallet providing station, the throughput of the palletizer will be improved still further.

According to an advantageous embodiment, the palletizer can be implemented such that the two pallets are arranged one above the other. In this case, the package providing station can continuously operate, nonstop, with the exception of a vertical adjustment.

The present disclosure additionally relates to a palletizer for executing one of the above-described methods.

BRIEF DESCRIPTION OF THE DRAWINGS

In the following, the disclosure will be described in detail on the basis of an embodiment and with reference to the drawings, in which:

FIGS. 3a to 3e show schematic representations of a second embodiment according to the present disclosure, used for unloading a pallet.

DETAILED DESCRIPTION OF THE PREFERRED EMBODIMENT

Figure 1:
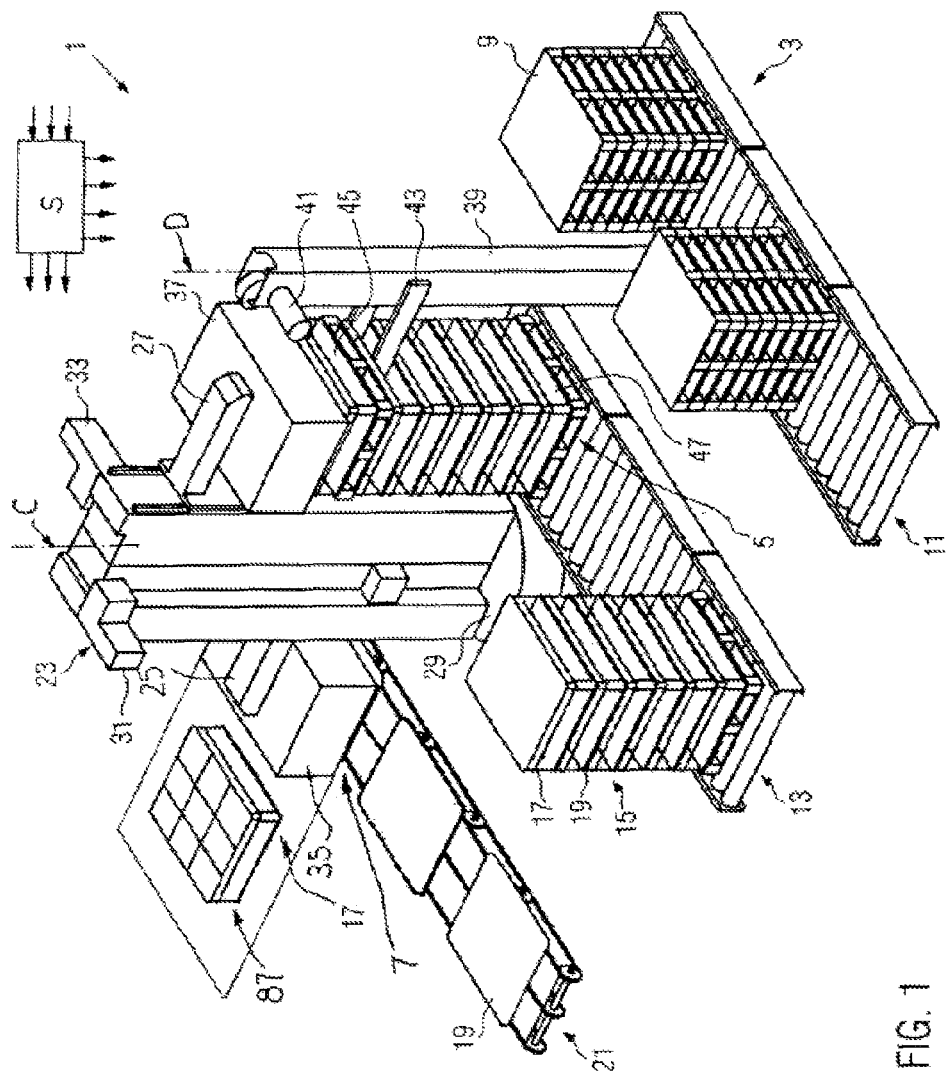
FIG. 1 shows a perspective view of an embodiment of the palletizer according to the present disclosure.

FIG. 1 shows a perspective view of an embodiment of the palletizer according to the present disclosure. The palletizer 1 comprises a pallet providing station 3, a loading station 5 and a package providing station 7 having a package layer conveyor 87 associated therewith. The pallet providing station 3 serves to provide empty pallets 9, which are stacked one on top of the other in this embodiment. The empty pallets 9 are here delivered or removed in stacks via a conveyor 11. Alternatively, they may also simply be put down at or delivered to an appropriate location, e.g. by means of a jack lift or a fork lift truck. Also the loading station 5 has associated therewith a conveyor belt 13 on which fully packed pallets 15 can be transported away, when the palletizer 1 is used for loading, and fetched, when the palletizer 1 is used for unloading. All the above-mentioned stations 3, 5, 7 as well as conveyors and transport means 11, 13, 21 and 87 are arranged such that they extend close to the ground essentially in one plane A.

In the present embodiment, a fully packed pallet 15 has arranged thereon six layers; depending on the respective product, the number of layers may, however, also be higher or lower. One layer comprises here a plurality of packages, in particular single-use packages or the like. Intermediate layers 19 consisting of cardboard or plastic material may be arranged between the individual layers for position stabilization.

The package providing station 7 additionally comprises a conveyor belt 21 by means of which the intermediate layers 19 are provided one by one. Furthermore (here not shown), a package providing station normally also comprises means for aligning and centering the packages in a layer, when the palletizer 1 is used for the purpose of loading.

The package providing station 7 and the loading station 5 have associated therewith a vertical rotary column 23 having arranged thereon two arms 25 and 27 which are vertically adjustable, independently of one another, along perpendicular guide means. The rotary column 23 is able to rotate or swing about its vertical axis C on a circular table 29 in a program-controlled manner. The arms 25 and 27 are driven by hoist motors 31, 33, which are program controlled as well. Each of the arms 25 and 27 carries a roller carpet head or shutter head 35, 37 known from the prior art (DE 29 45 883 A1, DE 34 09 964 A1) and adapted to be used for picking up a layer of packages 17 from the package layer conveyor 87 of the package providing station 7 when a pallet 9 is being loaded. During the loading operation, the aim 25 is lifted by means of the hoist motor 31 and, after a 180° rotation of the rotary column 23, the layer of packages that has been picked up by the roller carpet head 35 is put down on a pallet 45, 47 provided in the loading station 5. The situation described corresponds in FIG. 1 to the arrangement of the second roller carpet head 37. The roller carpet head, which can advantageously be used in particular for delicate single-use packages, may also be replaced by other gripping heads, if this should be expedient for the type of packages to be handled.

The pallet providing station 3 has associated therewith a second perpendicularly arranged rotary column 39, which also comprises an arm 43 that is vertically adjustable with the aid of a further program-controlled hoist motor 41, said rotary column 39 being arranged between the conveyors 11 and 13 which extend in parallel. According to the present disclosure, this arm 43 is implemented such that it is able to pick up an empty pallet 45 from the pallet stack 9 and to hold it above a packed pallet 47 in the loading station 5 after a 180° rotation of the rotary column 39 about its perpendicular axis of rotation D, which is oriented in spaced parallel relationship with the axis of rotation C. In particular, the empty pallet 45 is arranged above the fully packed pallet 47 in such a way that the two pallets 45 and 47 overlap each other and are in alignment with each other at least partially. The roller carpet or shutter heads 35 and 37 have on the lower surface thereof controllable gripping tools, preferably vacuum cups, for taking hold of the intermediate layers 19.

The palletizer 1 according to the present disclosure achieves the following advantage in comparison with known palletizers: since a second pallet 45 can, at least temporarily, be provided in a plane above a first packed pallet 47, it will be possible to avoid down times during loading and unloading of pallets (this will be described in more detail in connection with FIGS. 2 and 3); in the prior art, such down times occur whenever a fully packed pallet must be transported away or when, during unloading, a fully packed pallet must be fetched. It follows that a continuous supply of packages is now possible. As can be seen in FIG. 1, the palletizer 1 according to the present disclosure is so conceived that the first rotary column 23 will be able to provide layers of packages 17 in the loading station 5 even if a first pallet 47 has already been fully packed, since, thanks to the second pallet 45 which is provided at a position above said first pallet 47, loading of this second pallet 45 can already be started. As soon as the packed pallet 47 has been removed, the new pallet 45 to be loaded can be lowered down to the conveyor belt 13. This lowering can be executed in one go or step by step.

Similar advantages are achieved during unloading, since, also during the unloading process, down times with respect to package provision can be avoided during an exchange of pallets. In this case, pallet 45 represents the pallet to be unloaded from which the roller carpet head 37 just removes the last layer 17 while, simultaneously, a new, fully packed pallet 47 can already by provided below the pallet 45. This pallet 47 will then be unloaded next. It follows that, also in this case, the package providing station 7 need not wait for anon/pallet, but can continue to operate nonstop.

In order to guarantee sufficient time for transporting packed pallets away and for fetching pallets to be unloaded, the rotary column 39 and the arm 43 are dimensioned such that one or two or three layers of packages can still be present on the pallet 45. Since this is enough for most cases of use, it will suffice when the structural design of the rotary column 39 and of the arm 43 is adapted to these reduced mechanical loads. Hence, the structural design of the rotary column 39 and of the arm 43 can be simple and filigree.

According to one variant, the pallet providing station 3 as well as the package providing station 7 can also be so conceived that, instead of a rotary column 23, 39 with a vertically adjustable arm 25, 27, 43, also a stationary column with a vertically adjustable rotary arm or a stationary column with a vertically adjustable linear axle may be used, so as to be able to provide and remove the pallets and packages.

Likewise, the package providing station 7 of the palletizer according to the present disclosure is not limited to the present embodiment. For example, the layers of packages can be pushed into and out of the roller carpet heads by means of insert devices which are not shown in detail, and they can be centered in said roller carpet heads.

Furthermore, the concept according to the present disclosure, according to which a second pallet is positioned above a packed first pallet for some time, can also be realized in palletizers comprising more than one loading station.

In addition, the palletizer 1 according to the present embodiment is so conceived that the packages of the layers of packages 17 are lowered onto pallet 47 or onto pallet 45 by the arms 25, 27, or they are picked up from these pallets during unloading. Alternatively, it is, however, also possible to move the packages in only one plane and, when a layer of packages 17 has been placed on the pallet or removed therefrom, to lower/lift the pallet with the layers of packages positioned thereon. Also in the case of this embodiment, the present disclosure offers the possibility of implementing the pallet providing station such that a second pallet is arranged above a packed first pallet at least for some time, so that down times will be avoided when the packed pallet is transported away or fetched.

In the following, embodiments of the pallet loading and unloading method according to the present disclosure will be explained in more detail with reference to FIGS. 2a to 2e and 3a to 3e. This simultaneously represents a detailed description of the mode of operation of the palletizer 1 shown and described in FIG. 1. Accordingly, reference numerals for components, which have already been used in connection with the embodiment of the palletizer according to the present disclosure shown in FIG. 1, will be used again in FIGS. 2a to 2e and 3a to 3e, and, as regards an adequate detailed description of these components and of their features, reference will be made to the above.

Figure 2A:
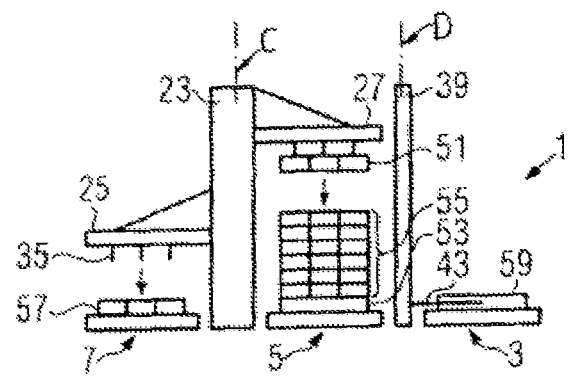
FIGS. 2a to 2e show schematic representations of a first embodiment according to the present disclosure, used for loading a pallet.

FIG. 2a shows schematically and exemplarily the palletizer 1 in a side view. On the right hand side, the pallet providing station 3 can be seen, whereas the component in the middle is the loading station 5 and that between the pallet providing station 3 and the loading station 5 is the rotary column 39, and the component on the left hand side is the package providing station 7 which is arranged to left of the rotary column 23. In the condition shown, a last layer of packages 51, e.g. a layer of bottle crates, single-use packages or the like, is provided by the arm 27 in the loading station 5 for a pallet 53 on which a specific number (here six) of layers of packages 55 has already been placed, and then moved downwards in the direction of the pallet 53 together with an intermediate layer 19, which is here not shown.

The second arm 25 on the rotary column 23 is lowered simultaneously so as to be able to pick up another layer of packages 57 with its roller carpet head 35. The packages need not be of the same type as those comprised in the layer of packages 51. In manner which is not shown in detail, the roller carpet head 35 picks up, by means of controllable vacuum cups provided on the lower surface thereof, an intermediate layer 19 which is fed by the conveyor belt 21 into the package providing station 7 from the side, while the layer of packages 57 is pushed into the roller carpet head on a level above said intermediate layer.

In the meantime, the arm 43 of the rotary column 39 picks up an empty pallet 59 in the pallet providing station 3.

Figure 2B:
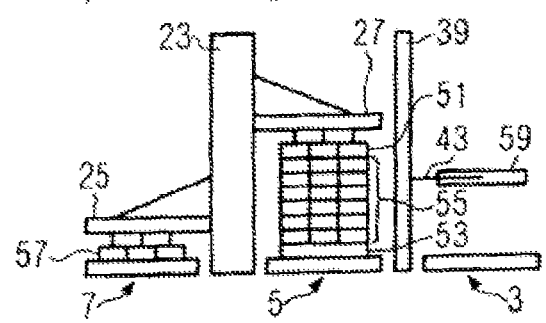

In the condition shown in FIG. 2b, the empty pallet 59 has been raised by the arm 43. Simultaneously, the arm 27 deposited, in the area of the loading station 5, the layer of packages 51 on the upper surface of the first pallet 53 carrying the other layers of packages 55. The second arm 25, in turn, picked up the new layer of packages 57 in the package providing station 7.

Figure 2C:
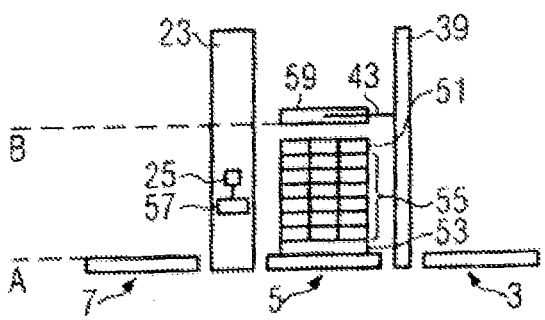

FIG. 2c shows the condition according to the present disclosure in which the empty second pallet 59 is provided in the loading station 5 at a position above the packed pallet—consisting of the pallet 53, the layers of packages 55 and the last layer of packages 51 placed on top. For establishing this condition, the rotary column 39 has previously been rotated by 180°. On the side of the package providing station 7, the rotary column 23 has already been rotated by approx. 90°, and the second arm 25, which moves upwards with the new layer of packages 57, can be seen schematically. Simultaneously, the second arm 27, which rotates in the opposite direction, is moved downwards on the opposite side (cannot be seen).

It follows that, according to the present disclosure, the first pallet 53 is positioned on a first plane A, whereas in this condition the second pallet 59 is positioned on a second plane B above the packed pallet. In this embodiment, the two pallets are arranged one above the other in alignment with one another.

Figure 2D:
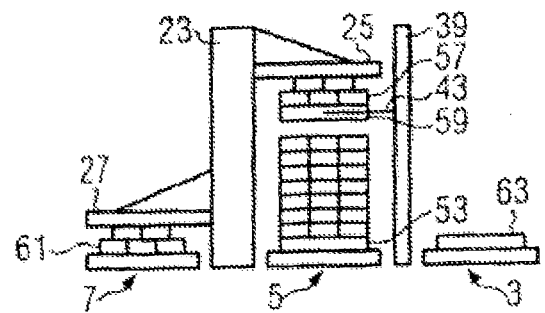

FIG. 2d shows the condition in which, at the loading station 5, the new layer of packages 57, which has been rotated by 180°, together with the intermediate layer 19 (not shown), which has been carried along below said new layer of packages 57, has been placed by the arm 25 on the second pallet 59, which is still located above the packed first pallet 53, and released subsequently. Simultaneously, the arm 27 picks up a further new layer of packages 61 at the package providing station 7, and also a new empty pallet 63 is provided in the pallet providing station 3. As can be seen in FIG. 1, the new empty pallet can, alternatively, also be taken from a stack.

Figure 2E:
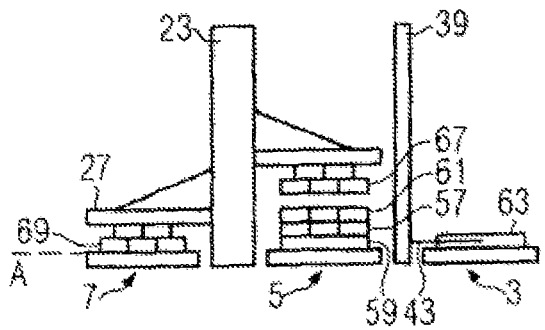

FIG. 2e shows the condition in which the previously fully packed first pallet 53 with the layers of packages 55 and 51 has already been transported away. After said transporting away, the pallet 59, which had already been packed partially, was lowered down to the first plane A of the loading station 5, and, simultaneously, it was possible to fetch, without any delay, additional layers 61, 67 via the package providing station 7 and to place them on the second pallet 59 by making alternately use of the arms 25 and 27. At the same time, the arm 43 picks up the new pallet 63 at the pallet providing station 3 and the carrier 27 picks up a further layer of packages 69 at the package providing station 7.

As can be seen from FIGS. 2d and 2e, the method according to the present disclosure offers the advantage that the package providing station 7 with the rotary column 23 and the two arms 25, 27 can operate nonstop, irrespectively of whether or not the fully packed pallet 53 has already been transported away, since new layers of packages, in this case the layers 57, 61, could be placed on the newly provided second pallet 59 without delay. In contrast to this, the layers of packages 57, 61 could not yet have been placed on the second pallet 59 in the condition shown in FIG. 2e, if a palletizer known from the prior art were used.

Since the fully packed pallet is normally transported away within a narrow time frame, it will, as has already been mentioned hereinbefore in connection with the palletizer 1, suffice to implement the arm 43 in such a way that it will be able to carry at most one, two or three layers of packages, including the second pallet 59.

The lowering of the second pallet 59 by the vertically adjustable arm 43, which is carried out between the condition shown in FIG. 2d and the condition shown in FIG. 2e, is executed either step by step, especially when a new layer of packages can be deposited via the package providing station 7 during the lowering operation, or fully in one step, especially when no new layer of packages is ready for deposition during the lowering operation.

FIGS. 3a to 3e illustrate an embodiment of the method for unloading a pallet according to the present disclosure. Like the embodiment of the method for loading a pallet according to the present disclosure, which is shown in FIGS. 2a to 2e, said unloading method is described with reference to a schematic side view of the embodiment of the palletizer 1 according to the present disclosure which is shown in FIG. 1. Components with reference numerals which have already been used in the preceding figures are no longer described in detail, but the description of these components in the foregoing is herewith referred to.

FIG. 3a shows the condition in which a layer of packages 71 is removed from a pallet 73 by means of the arm 27 of the package providing station 7. As can be seen in FIG. 3a, an additional layer of packages 75 is still present on the first pallet 73 when the layer of packages 71 has been raised. The second arm 25 of the package providing station 7 has just put down a layer of packages 77 and is moving upwards again. The arm 43 of the pallet providing station 3 is not yet in use in this condition.

The condition shown in FIG. 3b shows how, according to the present disclosure, the first pallet 73 with a residual layer of packages 75 is positioned above a newly provided, second, fully packed pallet 79 with seven layers of packages 81. The first pallet 73 has previously been raised by the arm 43 from plane A upwards to plane B. Simultaneously, the arm 25 moves further upwards, while the rotary column 23 has already been rotated by approx. 90°. The second arm 27 carrying the picked-up layer of packages 71 is just carrying out a downward movement at the back of the rotary column 23 and is therefore not visible while it rotates in the direction of the package providing station 7.

FIG. 3c shows how the arm 25 picks up the last layer of packages 75 from the first pallet 73. In the package providing station 7, the second arm 27 has already put down the layer of packages 71 in the meantime and is now moving upwards again. The arm 43 still holds the first pallet in plane B.

FIG. 3d shows the condition in which, after a rotation of the rotary column 39 by 180°, the empty pallet 73 was rotated to a position above the pallet providing station and is now lowered. Simultaneously, the first layer of packages 83 is picked up by the arm 27 in the loading station 5. On the other hand, the first arm 25 has just put down the last layer 75 of the first pallet 73 on the package providing station 7, from where its transport is continued. The arm 43, in turn, lowers the empty first pallet 73 down to the pallet providing station 3.

FIG. 3e shows the condition in which the second pallet 79 is emptied still further. In the meantime, the first pallet 73 has been put down by the aim 43 on the side of the pallet providing station 3.

Figure 4:
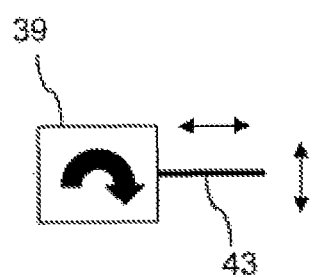
FIG. 4 is a top view of a rotary column with a vertically adjustable arm of the present disclosure, schematically illustrating a translational movement of the first arm, with directional arrows illustrating possible movement direction of the arm.

FIG. 4 shows how, according to the present disclosure, the arm 43 of the rotary column 39 can be adapted to be swiveled and/or moved translationally, at least in the horizontal plane, i.e. at right angles to its vertical movability up or down column 39. FIG. 4 shows a top view of the rotary column 39 with arrows illustrating the possible directions in which the arm 43 can move.

Just as in the case of the pallet loading method according to the present disclosure, the arm is also in this case implemented such that it will be able to carry one, two or three layers of packages together with an empty pallet. This will guarantee that, irrespectively of how long the provision of a new packed second pallet (here pallet 79) is going to take, the unloading of the first pallet through the package providing station 7 can be continued without any loss of time, and, simultaneously, it will suffice when the carrying capacity of the arm 43 suffices for carrying one, two or three layers including the pallet.

As has already been described in connection with the lowering operation, also the lifting of the first pallet, here pallet 73, between the respective conditions shown in FIGS. 3a and 3b can be executed step by step, viz. when a layer can be picked up by 25 or 27 at the moment in question, or it can be executed in one go, viz. when during the pallet lifting operation neither arm 25 nor arm 27 is available for picking up a layer of packages at the moment in question.

Thanks to the arrangement of a packed pallet and of an empty pallet on two different planes, the two pallets being especially arranged such that they are partly or fully positioned one above the other, the provision and the removal of the packed pallet is, as regards process technology, separated from the depositing and the lifting of the layers of packages in such a way that the depositing and the lifting can be executed nonstop, even during an exchange of pallets, whereby a significant increase in the throughput of the palletizer can be achieved. By means of the palletizing machine described, a maximum performance of 600 to 700 layers of packages per hour can be accomplished, even if the packages processed are shrink wrap packages, with a cycle time of 5 to 6 seconds, in spite of the fact that all the conveyors and stations for conveying the pallets and the packages are arranged close to the floor.

The sequence of operations described in FIGS. 2a to 2e and 3a to 3e for loading and unloading a pallet should only be regarded as an example and the movements of the individual elements relative to one another can also be varied. In particular, the individual movements of the arms 25, 27 and 43 are normally adapted to the given circumstances so that an optimum process can be executed.

All the sequences of operations of the palletizer 1 are program-controlled by one or a plurality of coordinated control units S and executed in synchronism. Depending on the respective types of the packages, a plurality of programs, which only have to be called if required, can be stored. The control unit S communicates on its input side with a large number of sensors for detecting positions, rotary positions, speeds and protection units and provides on its output side signals for operating and controlling all the drives for rotating or alternately swivelling the two rotary columns, the drives 31, 33 and 42 for lifting and lowering the arms 25, 27 and 43, the actuators for opening and closing, i.e. moving together and moving apart, the roller carpets for the layers of packages and for operating the vacuum cups provided on the lower surface of said roller carpets and used for handling the intermediate layers. In addition, the control unit S is also used for controlling the coordinated operations of the drive motors (not shown) of all the transport means and conveyors.

The transport means 11, 13, 21 and 87 are preferably oriented such that they extend parallel and/or at right angles to one another in the manner shown in the representation, but, if necessary, they may also be arranged in some other configuration, e.g. when the rotary column 23 is to be equipped with three, or, on all four sides, with four 90°-offset arms, which are vertically adjustable independently of one another and which have replaceably secured thereto layer gripping systems, in particular roller carpet heads or shutter heads. It may then also be expedient to provide the rotary column 39 with two arms, or to provide two rotary columns, which are displaced relative to one another, on the periphery of the rotary column 23 for handling the pallets.

The invention claimed is:

1. A method for loading a pallet, comprising the steps of:
    placing packages on a first pallet disposed in a first plane,
    providing a second pallet above the packed first pallet in a second plane,
    transporting the packed first pallet away,
    completely lowering the second pallet in one step from the second plane down to the first plane after transporting the first pallet away,
    placing packages on the second pallet disposed in the first plane,
    providing a pelletizer head movable in both horizontal and vertical planes,
    adjusting said palletizer head to selectively place packages on either the first pallet or the second pallet, and wherein during the placing step the selected pallet is in one of the first plane or the second plane.

2. A method according to claim 1, wherein packages are already being placed on the second pallet while said second pallet is still positioned above the first pallet.

3. A method according to claim 2, wherein, prior to depositing a predetermined number of layers on the second pallet, lowering lower second pallet to the first plane.

4. The method of claim 3, wherein depositing a predetermined number of layers comprises one of the second, third or fourth layer of packages.

5. A method for unloading a pallet, comprising the steps of:
    completely raising a first pallet in one step from a second plane up to a first plane prior to providing a second packed pallet,
    removing packages from the first pallet disposed in the first plane,
    providing the second packed pallet below the first pallet in a second plane,
    transporting the first pallet away:
    providing a pelletizer head movable in both horizontal and vertical planes, and adjusting said palletizer head to selectively remove packages from either the first pallet or the second pallet, and wherein during the removal step the selected pallet is in one of the first plane or the second plane.

6. The method of claim 1, wherein the packages are placed in layers on the first pallet.

7. The method of claim 1, wherein the packages are one of bottle crates and single-use packages.

8. A palletizer for executing a method according to claim 1 or 5.

9. A method according to claim 5, wherein packages are still removed from the first pallet while the second pallet is being provided at a position below the first pallet.

10. A method according to claim 9, wherein the first pallet is raised to the first plane as soon as only a predetermined maximum number of layers of packages is present on said first pallet.

11. The method of claim 10, wherein the maximum number is one of one, two or three layers of packages.

12. The method of claim 5, wherein the removing packages is performed in layers.

13. The method of claim 5, wherein the packages are one of bottle crates and single-use packages.

14. A palletizer used for placing packages, in particular bottle crates, single-use packages or the like, on a pallet or removing them from a pallet, the packages being placed on and removed from said pallet in particular in the form of layers, and comprising a loading station, a pallet providing station, the loading station and the pallet providing station being implemented and adapted to one another in such a way that, for a certain period of time, a fully packed first pallet is disposed in the loading station on a plane one of below an empty or only partially packed second pallet;

wherein the pallet providing station comprises a first vertically adjustable arm, which is preferably movable along a perpendicular guide means and which is used for transporting a pallet from the pallet providing station to the loading station or vice versa;

wherein the first vertically adjustable arm is additionally implemented such that it is also adapted to be at least one of swiveled or moved translationally, at least in the horizontal plane; and the palletizer further comprising a packet providing station having at least a second vertically adjustable arm for providing the packages on a pallet in the loading station.

15. A palletizer according to claim 14, wherein the first vertically adjustable arm is dimensioned such that it can carry at most one pallet with a predetermined number of layers of packages.

16. The palletizer of claim 15, wherein the predetermined number of layers of packages is one of one, two or three layers.

* * * * *